United States Patent [19]

Shibata et al.

[11] Patent Number: 5,758,039
[45] Date of Patent: May 26, 1998

[54] SMALL SIZE PRINTER HAVING MULTIPLE FONT SIZES

[75] Inventors: Kazunori Shibata, Kurume; Kiyoshi Baba, Fukuoka-ken; Tsutomu Egashira, Saga-ken; Kenichi Ohsato, Tosu; Masahiro Kondoh, Kurume; Yuji Tanaka, Chikushino; Kazuyoshi Nakamura, Fukuoka; Hiroyuki Fukusako, Tosu, all of Japan

[73] Assignee: Matsushita Electric Industrial Co., Ltd., Osaka, Japan

[21] Appl. No.: 821,293

[22] Filed: Mar. 20, 1997

Related U.S. Application Data

[63] Continuation of Ser. No. 712,748, Sep. 12, 1996, abandoned, which is a continuation of Ser. No. 168,153, Dec. 17, 1993, abandoned.

[30] Foreign Application Priority Data

| Dec. 25, 1992 | [JP] | Japan | 4-345951 |
| Dec. 25, 1992 | [JP] | Japan | 4-345952 |
| Feb. 10, 1993 | [JP] | Japan | 5-022254 |

[51] Int. Cl.⁶ .................................................. G06F 15/00
[52] U.S. Cl. ....................................... 395/110; 395/117
[58] Field of Search ............................... 395/110, 101, 395/117, 114, 111, 112, 340, 115, 113

[56] References Cited

U.S. PATENT DOCUMENTS

| 3,920,979 | 11/1975 | Kilby et al. | 395/101 |
| 4,623,965 | 11/1986 | Wing | 395/117 |
| 5,075,862 | 12/1991 | Doeberl et al. | 395/117 |
| 5,081,579 | 1/1992 | Komai et al. | 364/405 |
| 5,100,248 | 3/1992 | Cripe | 400/76 |
| 5,113,488 | 5/1992 | Bischel et al. | 395/112 |
| 5,223,939 | 6/1993 | Imaizumi et al. | 358/296 |
| 5,271,065 | 12/1993 | Rourke et al. | 395/117 |
| 5,278,947 | 1/1994 | Balga, Jr., et al. | 395/111 |
| 5,299,295 | 3/1994 | Kim et al. | 395/101 |
| 5,347,302 | 9/1994 | Simonoff | 395/117 |

FOREIGN PATENT DOCUMENTS

| 55-47425 | 11/1980 | Japan. |
| 62-234959 | 10/1987 | Japan. |
| 330179B2 | 1/1991 | Japan. |

Primary Examiner—Matthew M. Kim
Assistant Examiner—Steven P. Sax
Attorney, Agent, or Firm—Watson Cole Stevens Davis, P.L.L.C.

[57] ABSTRACT

Upon issuance of a check, predetermined mark data are added to data and letters indicating an amount of money so as to be converted into new data and letters indicating the amount of money. Further, the printing capacity of a preset printing area on the check is compared with the volume of printing data to be printed, and a printing font to be used is selected in accordance with a result of the comparison. A separate template on which a plurality of initial printing positions and codes for indicating the initial printing positions are indicated is superposed with the check, and the corresponding code is inputted so as to designate an initial printing position. With this arrangement, it is possible to provide a small-sized printer which can enhance the visibility of the content printed on the check, can prevent the letters indicating an amount of money on the check from being raised so as to enhance the trust in banking transaction, and can easily set an optimum printing position.

16 Claims, 7 Drawing Sheets

SMALL SIZE PRINTER HAVING MULTIPLE FONT SIZES

This application is a continuation of application Ser. No. 08/712,748, filed Sep. 12, 1996 (abandoned), which is a continuation of application Ser. No. 08/168,153, filed Dec. 17, 1993 (abandoned).

BACKGROUND OF THE INVENTION

The present invention relates to a small-sized printer for printing letters on a small printing medium of a fixed form such as a check adapted to be used in, for example, the banking business.

These years, with an increased use of checks, the demand for check issuance machine adapted to be used in the transaction of receipts and disbursement involving the issuance of checks has been increased more and more. In particular, the demand for a small-sized check issuance machine incorporating a printing function for directly printing predetermined letters on a check has been increased.

A typical conventional check issuance machine uses a single font of letters and is in general driven by a single drive source. Accordingly, only one kind of paper feed and spacing is carried out. The paper feed and the spacing are set in accordance with the single font of letters to be used, and the printing is carried out with the use of one and the same font of letters having a uniform size, from the initiation to the completion of the printing. For example, Japanese Patent Publication No. 55-47425 (U.S. Pat. No. 3,920,979) to J. Kilby discloses a check issuance machine as mentioned above, using a thermal printing device.

However, in order to print a string of several numerals or several letters in a preset printing area on a check or the like, the degrees of the paper feed and spacing have to be adjusted to be small, and accordingly, letters in a string are printed in a date entry space, a recipient entry space or a memorandum entry space, inevitably at small intervals, resulting in occurrence of a problem such that the printed letters are difficult to read and offer an inferior visibility. It is believed that a small-sized printer which can solve the above-mentioned problem has not yet been proposed.

SUMMARY OF THE INVENTION

According to one aspect of the present invention, there is provided a small sized printer comprising input means for inputting data necessary for issuance of a check, memory means for storing therein data inputted through the input means and relating to a recipient, display means and printing means for displaying the data relating to the recipient and an amount of money upon issuance of the check, and printing the same on the check, output data generating means for generating printing data in the form of an output data string from the data relating to the recipient and the amount of money upon issuance of the check, data comparing means for comparing a capacity of a preset printing area on the check, in which letters are printed, with a volume of the data generated by the output data generating means, and font selecting means for selecting a desired font of letters to be used for the printing means, in accordance with a result of the comparison made by the comparing means.

As a result, a printing area which requires full confirmation can be printed with a large font, but other printing areas can be printed with a small font, to that it is possible to clearly print letters in preset printing areas on a check, and to enhance the visibility of the content given by the printed letters.

Further, according to another aspect of the present invention, there is provided a small-sized printer comprising input means for inputting data necessary for issuance of a check, memory means for storing therein data inputted through the input means and relating to a recipient, display means and printing means for displaying the data relating to the recipient and an amount of money upon issuance of the check, and printing the same on the check, mark adding means for adding predetermined mark data to the data relating to the recipient and the amount of money so as to convert them into new data and letters indicating the amount of money, output data generating means for generating printing data in the form of an output data string, from the new data relating to the recipient and the letters indicating the amount of money, comparing means for comparing a capacity of a preset printing area on the check, in which letters are printed, with a volume of the printing data generated by the output data generating means, and font selecting means for selecting a desired font to be used for the printing means, in accordance with a result of the comparison made by the comparing means.

As a result, a printing area which require full confirmation can be printed with a large font, and other printed areas can be printed with a small font. Thus, the preset area on a check can be surely printed, and the visibility of the content given by the printed letters can be enhanced. Further, the mark data which are newly added to the forehead of the string of numerals or letters indicating an amount of money prevents a check from being raised.

According to another aspect of the invention, there is provided a small-sized printer comprising input means for inputting data necessary for issuance of a check, memory means for storing therein data inputted through the input means and relating to a recipient, display means and printing means for displaying the data relating to the recipient and an amount of money upon issuance of the check, and for printing the same on the check, mark adding means for adding predetermined mark data to the data and the amount of money so as to convert them into new data and letters indicating the amount of money, output data generating means for generating printing data n the form of an output data string from the new data relating to the recipient and the letters indicating the amount of money upon issuance of the check, comparing means for comparing the capacity of a present printing area on the check, in which letters are printed, with the volume of the printing data generated by the output data generating means, font selecting means for selecting a desired font to be used for the printing means, in accordance with a result of the comparison made by the comparing means, and a separate template on which a plurality of initial printing positions and codes indicating the initial printing positions are indicated thereon, for designating the above-mentioned preset printing area on the check, whereby the template is adapted to be superposed with the check so as to obtain the corresponding codes which are then inputted through the input means in order to designate the initial printing positions.

With this arrangement, a printing area which requires full confirmation can be printed with a large font, and other printed areas can be printed with a small font. Thus, the preset area on a check can be surely printed, and the visibility of the content given by the printed letters can be enhanced. Further, mark data are added to the forehead of a string of numerals or alphabetical characters indicating an amount of money so as to prevent the check from being raised, and further, it is possible to provide an easily-handled small-sized printer which can flexibly cope with variations in the number of letters to be printed, and with which initial printing positions on a check can be easily designated.

Other features and advantages of the present invention will be apparent from the following description which will be made in detail with reference to the accompanying drawings in which:

DESCRIPTION OF THE PREFERRED EMBODIMENTS

Explanation will be made of an embodiment in which a small-sized printer is particularly used for printing a check.

Figure 1:
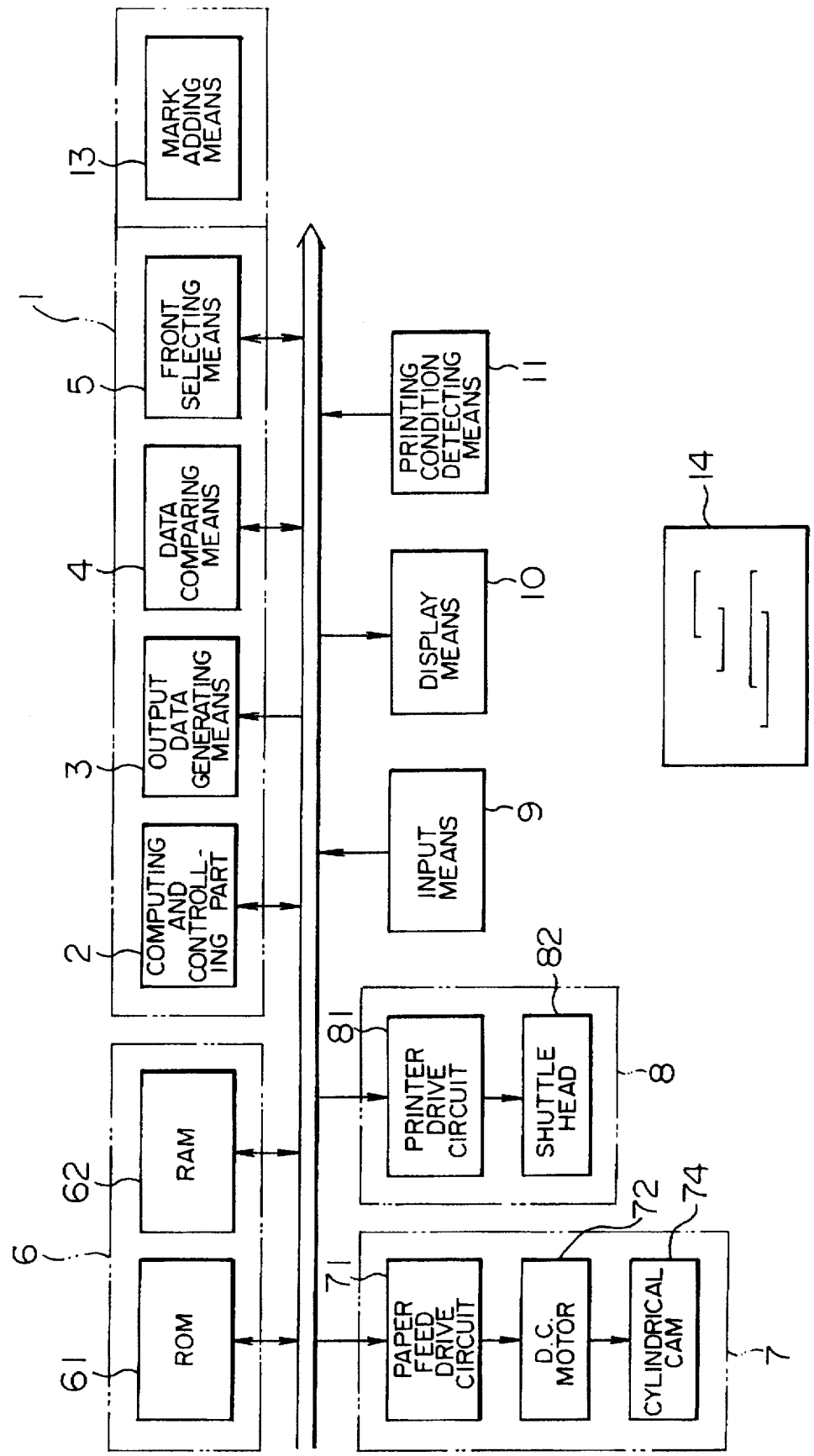
FIG. 1 is a block diagram showing a check issuance machine in one embodiment of the present invention.
Figure 2:
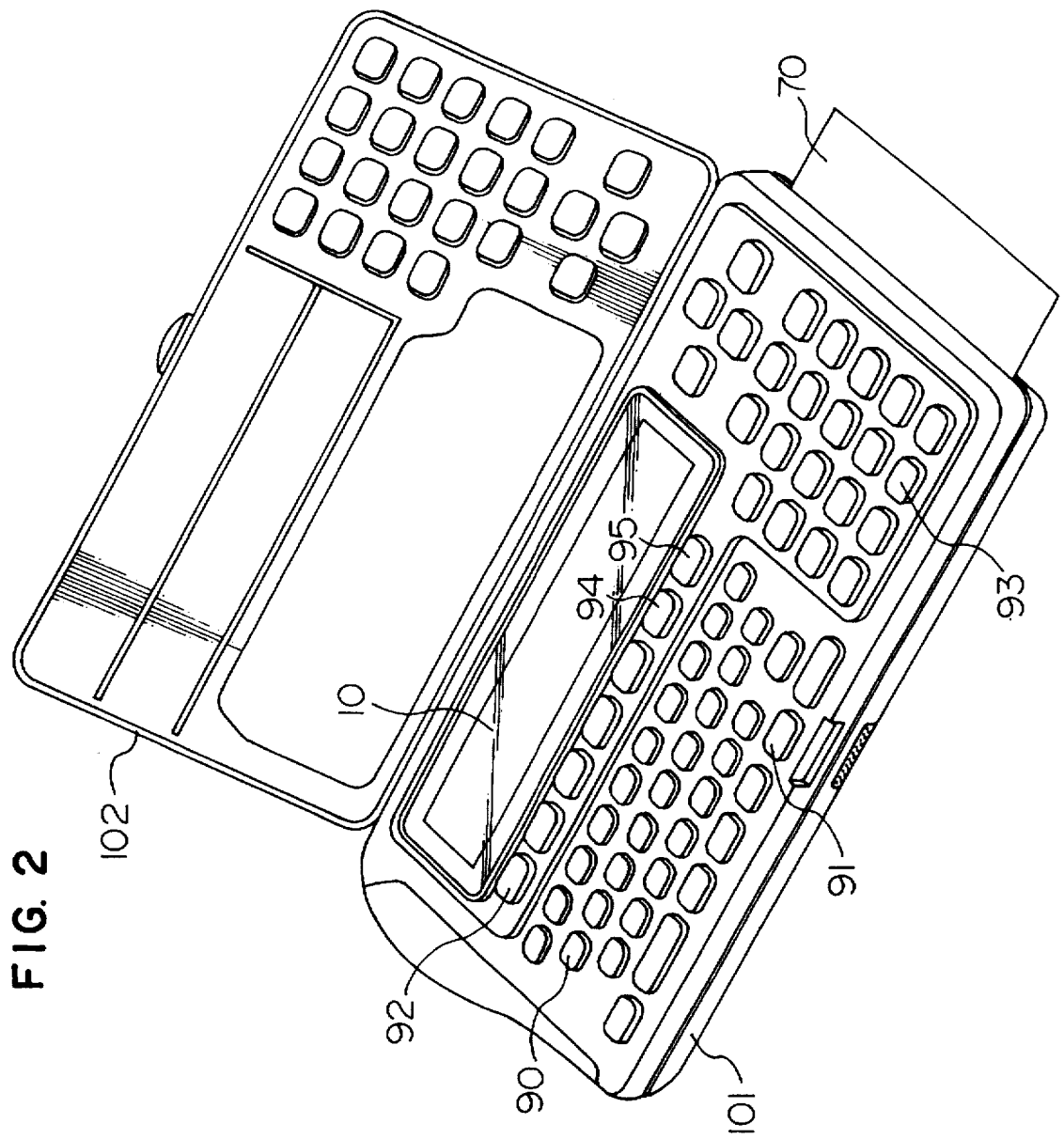
FIG. 2 is a perspective view illustrating the check issuance machine shown in FIG. 1.

Referring to FIG. 1 which is a block diagram showing a check issuance machine in this embodiment of the present invention, the check issuance machine comprises a CPU (central processing unit) 1 for controlling the machine in its entirety, and controlling the change-over between fonts of letters to be printed whenever it is necessary, a memory means 6 for storing therein a program to be controlled by the CPU 1 and processed data, a paper feed means 7 for driving and controlling paper feed, a printing means 8 for printing designated letters on a fed sheet when printing data and a printing instruction are inputted, an input means 9 having a group of keys as shown in FIG. 2, for inputting data and for selecting one of operating functions, a display means 10 for displaying data relating a recipient or the like, a printing condition detecting means 11 for detecting a condition of printing made by the printing means 8, and a separate template 14 on which a plurality of initial printing positions and code are indicated, for designating an initial printing position by inputting a code through the input means 9.

The above-mentioned CPU 1 is composed of a computing and controlling part 2 for computing and processing the control of the machine in its entirety, an output data generating means 3 for generating and delivering data relating to a recipient and an amount of money as printing data in the form of an output data string upon issuance of a check, a data comparing means 4 for comparing a printing capacity of a preset printing area in which letters are printed with the volume of the printing data generated from the output data generating means, a font selecting means 5 for selecting a desired font of printing letters corresponding to either one of the data and the amount of money, among a plurality of previously prepared fonts, in accordance with a result of the comparison made by the data comparing means 4, and a mark adding means 13 for adding predetermined marks to the printing data so as to convert them into new printing data.

The above-mentioned font selecting means 5 includes a memory element for storing therein font data, and accordingly, a plurality of printing fonts can be prepared beforehand. That is, in this embodiment, four fonts such as a matrix of dots in 5 rows and 8 columns, v.s. is, a 5×8 dot matrix, a 4×8 dot matrix, a 5×7 dot matrix and a 3×7 dot matrix are prepared.

The above-mentioned memory means 6 is composed of a read-only nonvolatile memory (which will be hereinbelow denoted "ROM") 61 in which the program controlled by the CPU 1 is stored, and an IC memory 62 (which will be hereinbelow denoted "RAM") in an area of which list data of recipients and a name, a date and memorandum per recipient record are stored, which delivers and receives data to and from the CPU 1 and from and into which data can be read and written at any time.

Figure 4:
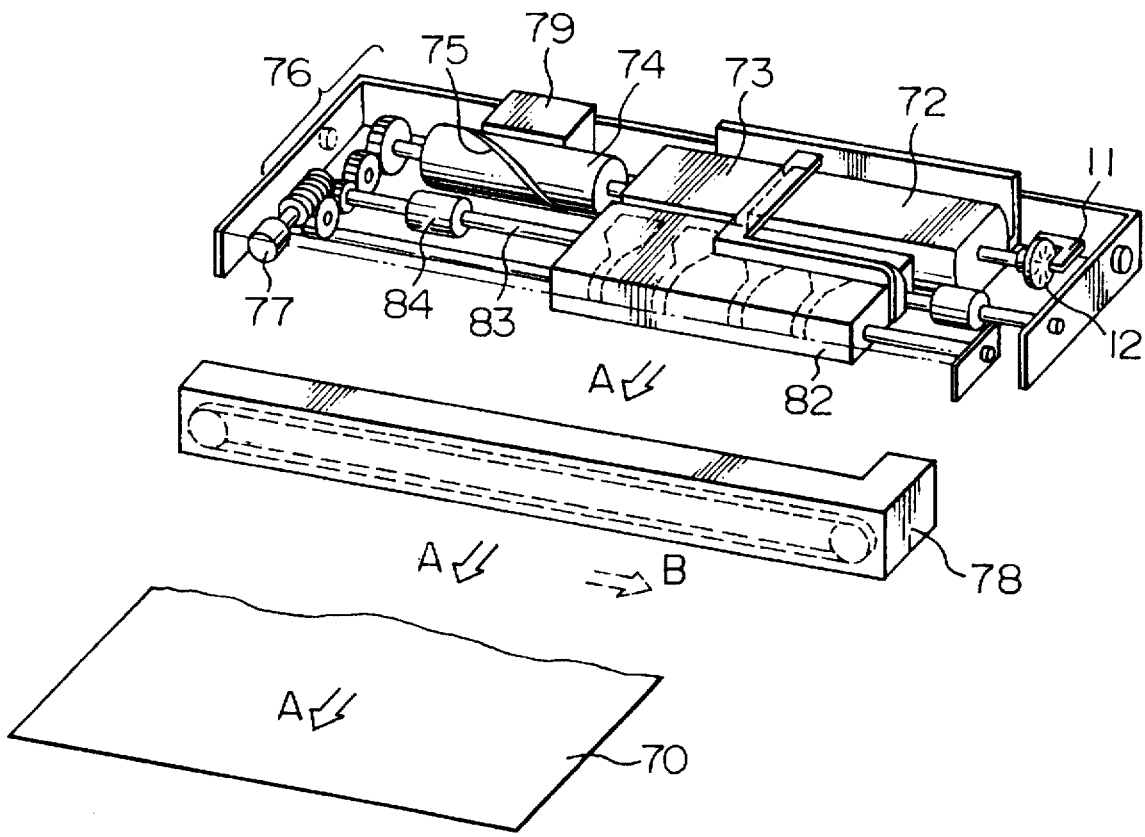
FIG. 4 is a perspective view illustrating a paper feed means and a printing means in the check issuance machine shown in FIG. 1.
Figure 5:
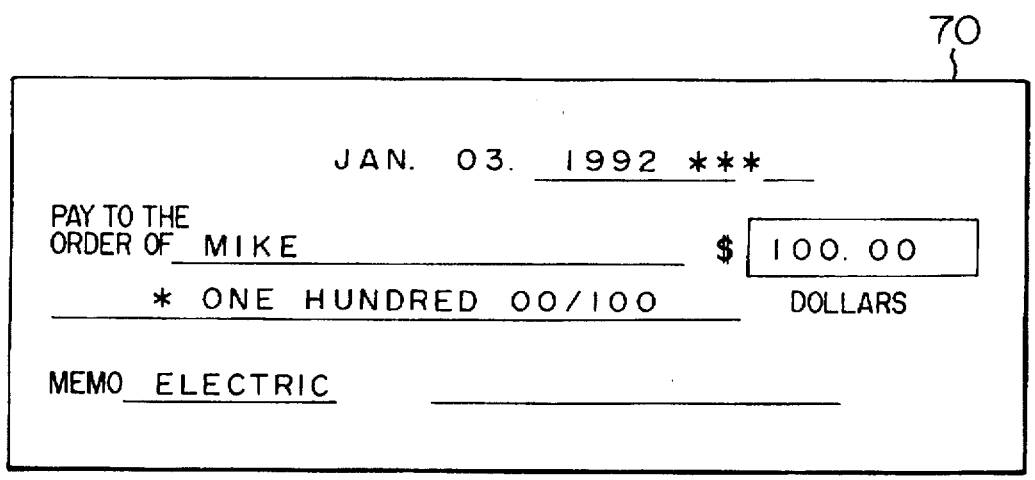
FIG. 5 is a view illustrating an example of printing on a check made by the check issuance machine shown in FIG. 1.

Referring to FIG. 2 which is a perspective view showing the small-sized check issuance machine in this embodiment of the present invention, a fixed-form printing medium (a sheet for a check, which will be herein-below denoted "check sheet") 70 which is inserted laterally of the check issuance machine is fed to the inside of the printing means 8 (see FIG. 4) by means of the paper feed means 7, and is printed by the printing means 8 so as to prepare a check as shown in FIG. 5 which shows an example of a printed check. The check issuance machine is composed of a body casing 101, a keyboard cover 102 operably attached to the body casing 10', and a group of keys arranged on the front panel of the body casing so as to constitute the input means 9. Several keys in the input means 9 consist of data keys 90 for inputting data relating to a recipient or the like, a registration mode key 91 for registering a recipient on a recipient list, input mode keys 92 for registering data or a check, and numeral input keys 93 for inputting a recipient's list number, an amount of money or the like, a printing key 94 for printing data on a check, and a setting key 95 for registering data relating to a recipient on a data list. Further, a display means 10 is provided on the above-mentioned front panel, which is an LCD display for displaying thereon data relating to a recipient or data on the lists.

Figure 3:
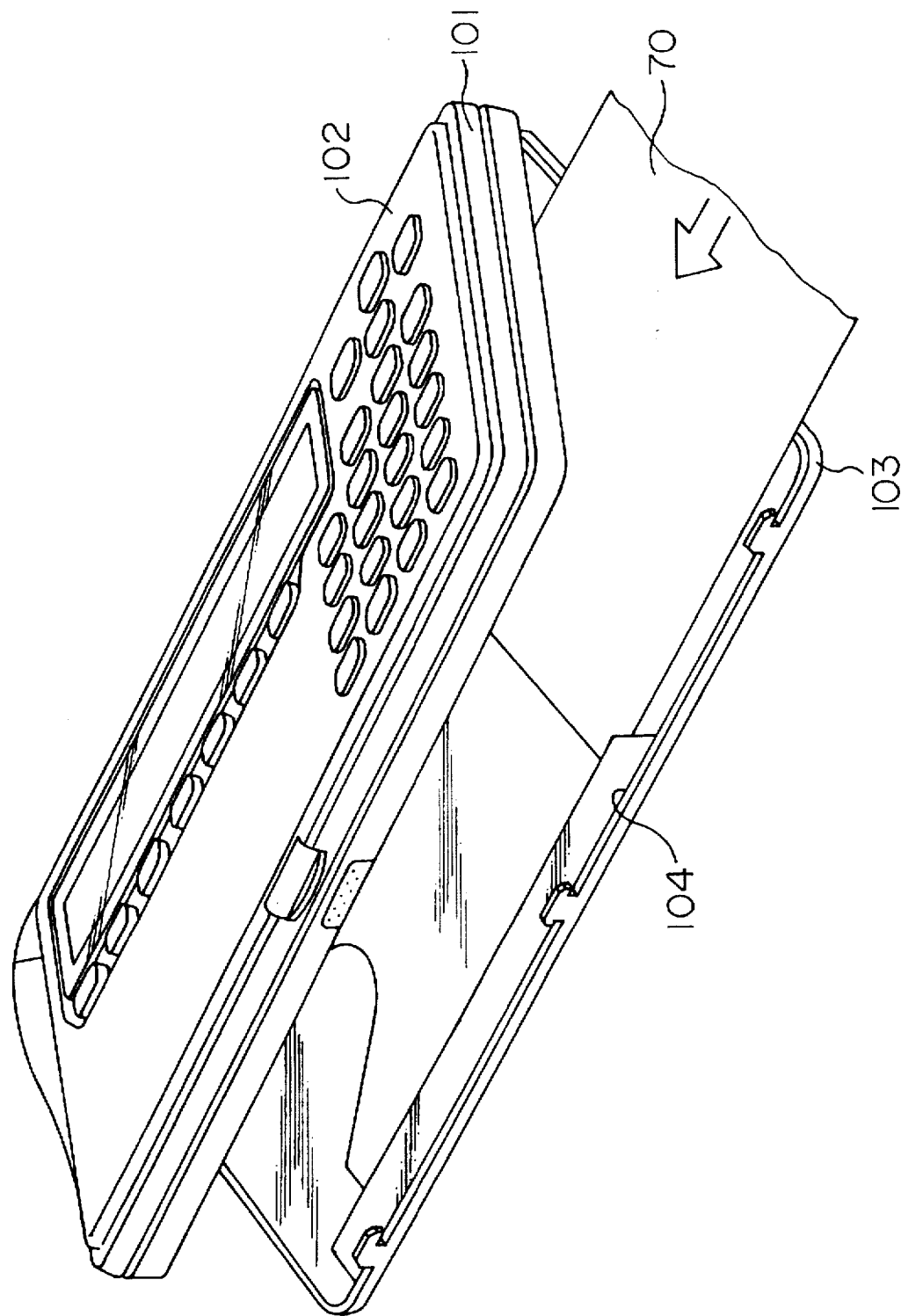
FIG. 3 is a perspective view illustrating the check issuance machine shown in FIG. 1, into which a check is inserted.

Referring to FIG. 3 which is a perspective view showing the check issuance machine in this embodiment of the present invention in a condition such that a check sheet 70 is inserted into the check issuance machine, a rear cover 103 which is operably attached to the body casing 101 is provided thereon with a guide 104 for positioning the check sheet 70 and guiding the check sheet during paper feed.

Referring to FIG. 4 which is a schematic perspective view showing the structures of the paper feed means 7 and the printing means 8 of the check issuance machine in this embodiment of the present invention, the paper feed means 7 and the printing means 8 are integrally formed with each other, and are incorporated in the body casing 101, as a one unit mechanism in which the displacement of a shuttle head 82 for printing letters, and the feed of the check sheet 70 are made by a single D.C. motor 72 having a drive shaft which is journalled at its one end with an encoder 12 which is received between the fork arms of the printing condition detecting means (photosensor) 11.

A gear box 73 is coupled to the other end of the drive shaft of the D.C. motor 72 so as to transmit a drive torque at a predetermined reduced speed to the output shaft (which is not shown) of the gear box 73. A cylindrical cam 74 is journalled to the drive shaft of the gear box 73, and is formed on its outer surface with meandering guide grooves 75 in which a protrusion (which are not shown) of the shuttle head 82 and a protrusion (which is also not shown) of a balancer 79 are engaged so that the shuttle head 82 and the balancer 73 are axially reciprocated left and right as the cylindrical cam 74 is rotated.

Further, a gear train 76 is coupled to the cylindrical cam 74 at the end remote from the gear box 73. This gear train 76 has two kinds of meshing conditions so as to deliver two drive torques at different speeds in different directions. With one of the drive torques, a ribbon drive shaft 77 is rotated so as to feed a ribbon 78 in a subscanning direction (indicated by the arrow B given by a chain line), and with the other one of the drive torques, a shaft 83 is rotated so as to drive paper feed rollers 84 which therefor feed the check sheet 70 in a main scanning direction (indicated by the arrow A given by a solid line).

FIG. 5 shows an example of the printing on the check sheet made as mentioned above.

Explanation will be made of the operational process of issuance of a check with the use of the thus constructed check issuance machine in the embodiment of the present invention, with reference to FIG. 6 which shows a flowchart.

At first, the check input mode key 92 is depressed so as to effect a data input mode for inputting data for a check (step 1).

In this phase, a recipient registered as a record, a date and a check number relating to the recipient are displayed on the LCD display 10 (step 2). If no data are registered, no data are displayed.

Of the displayed data, the recipient, the date, a memorandum and an amount of money ($, DOLLARS) are inputted through the data keys 90 and are set by depressing the setting key 95. The data relating to the recipient are stored in a predetermined storage area in the RAM 62, and are registered as a one record (step 3).

Figure 7:
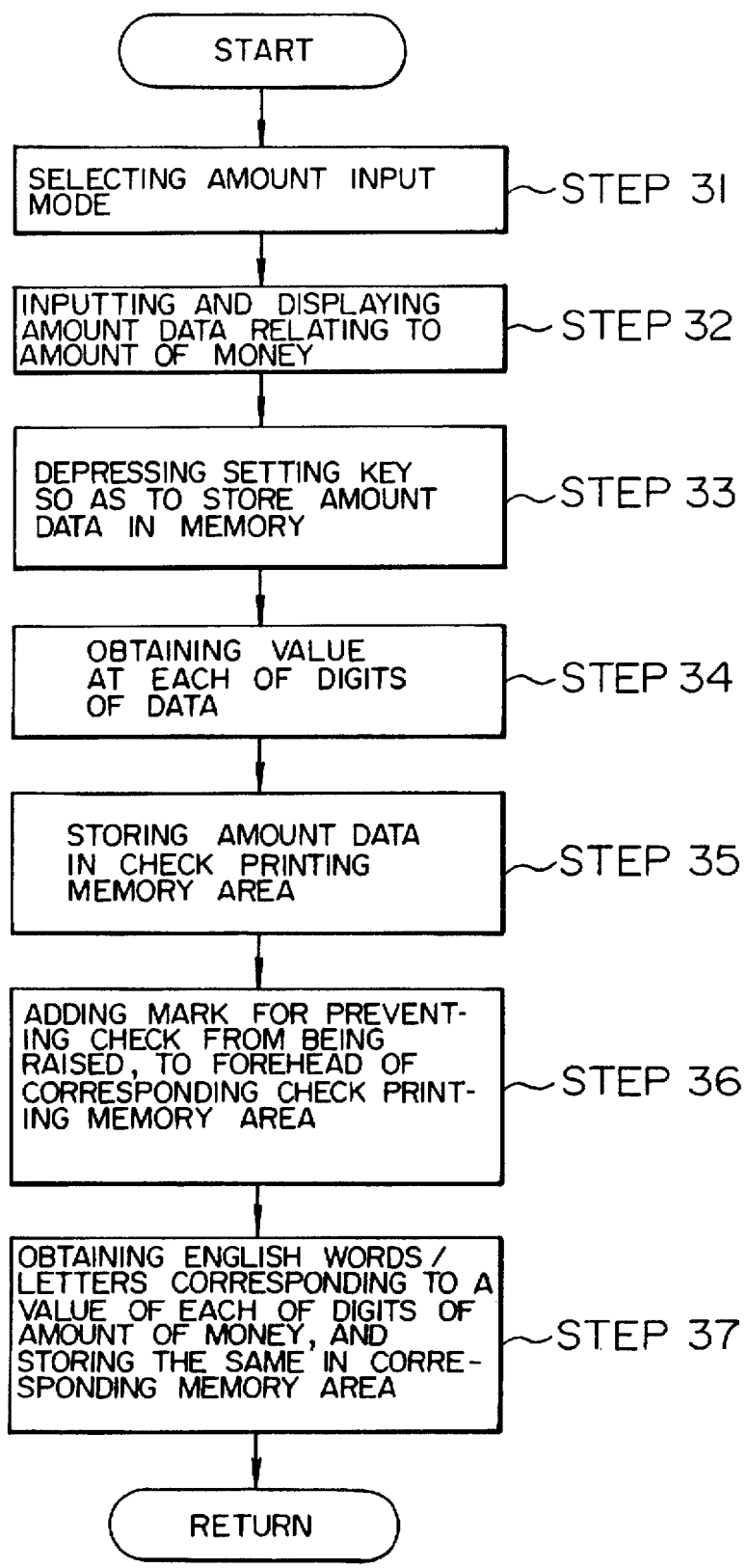
FIG. 7 is a flowchart showing a subroutine for adding a mark to a string of letters in the operation of the check issuance machine shown FIG. 1.

If the thus inputted data are amount data relating to the amount of money, the computing and controlling part 2 energizes the mark adding means 13 so as to add a mark to the data, for preventing the data from being raised. FIG. 7 shows a flowchart showing a subroutine for adding a mark to the data. Explanation will be made of this subroutine. A amount input mode is selected by depressing the input mode key 92 (step 31). If no data is inputted, no data are displayed on the LCD display 10. The user inputs for example, "100.00" as the amount data (step 32), and then depresses the setting key 95 (step 33). Values at digits are obtained (step 34), and the amount data are stored in a predetermined area in the RAM 62, and are registered as the amount data (step 35). A mark data (such as "*" in the example of the printing shown in FIG. 5) for preventing the check from being raised, is stored in a predetermined storage area in the RAM 62 corresponding to the forehead of the amount data by the mark adding means 13 (step 36). English letters such as "ONE HUNDRED" are obtained from a translation dictionary memory area in the ROM 61, corresponding to the values of numerals indicating the amount of money, and are stored in the corresponding area in the RAM 62 (step 37).

It is noted that the example shown in FIGS. 5 and 7 relates to the case where the mark is added to the amount of money exhibited by English letters. This case is taken in consideration with the convenience for the operator since a mark "$" has been generally printed beforehand in a numeral entry space on a check. However, the content of the ROM 61 can be suitably changed in accordance with a way of using the check issuance machine so that whether a mark is added to the indication of an amount of money or not can be selected, that whether a mark is added to English letters or numeral letters can be selected, or that marks are unconditionally added to both English letters and numeral letters.

Referring again to FIG. 6, when the data relating to the recipient are registered as a one record, the check number is increased by one so that a data input for the next check is effected (step 4). For example, the check number is increased such as CHK#: 11→CHK#: 12.

An input screen image concerning the input data is displayed on the LCD display 10. When the printing key 94 is depressed, a selection screen image asking whether the printing is made or not is displayed on the LCD display 10 (step 5). The data keys 90 are manipulated in accordance with the selection screen image displayed on the LCD display so as to designate execution or inexecution of the printing (step 6). If the execution of the printing is selected, the procedure is returned to step 1 so as to effect a data input mode for the next check. Meanwhile, if the execution of the printing is selected, the procedure is advanced to step 7.

Then, the output data generating means 3 reads printing data to be printed from a predetermined area in the RAM 62, and determines whether the printing data are those relating to a date, the recipient and memorandum or not, and whether the printing data is those relating to an amount of money indicated by numerals ($) or those indicated by English letters (DOLLARS), in accordance with the area in the memory means from which the printing data are read (step 7). In this case, as shown in FIG. 5 illustrating an example of the printing on a check, since he volume of the data which can be printed is fixed depending upon a printing area to be printed, the volume of the data which the data comparing means 4 uses as a reference value is automatically determined when an printing area where the data is printed is selected. Accordingly, with this determination, if it is determined that the data are those relating to the date, the recipient and the memorandum, the output data generating means 3 generates letters corresponding to the data relating to the date, the recipient and the memorandum with a printing font having a 5×8 dot array which is picked up from the font selecting means 5 (step 131).

Further, in the above-mentioned determination, if it is determined that the data are those relating to the amount of money indicated by numerals ($), the data comparing means 4 checks whether the number of letters corresponding to the data relating to the amount of money indicated by the numeral exceeds seven or not (step 8). If the number of letters indicated by the numerals is less than seven, the output data generating means 3 similarly generates letters corresponding to the data relating to the amount of money indicated by the numeral with the use of a printing font having a 5×8 dot array (step 132). If the number of letters is greater than 7 at step 8, the font selecting means 5 similarly selects letters corresponding to the data relating to the amount of money indicated by the numerals with the use of a printing font having a 4×8 dot array (step 133).

Further, if it is determined at step 7 that the data are those relating to amount of money indicated by English letters (DOLLARS), the data comparing means 4 further checks whether the number of the English letters (capital letters) is greater than 38 or not (step 9). In this determination, if it is determined that the number of the letters is greater than 38, the output data generating means 3 generates a string of letters in which the frontmost letter is capital but those subsequent thereto (from the second one) are smaller (step 11). After this process, the output data generating means 3 determines whether each of the letters is capital or not (step 12), and if it is determined that the letter is capital, the letter is similarly generated with the use of a printing font having a 5×8 dot array (step 134). Meanwhile, it is determined that the letter is small, the font selecting means 5 similarly selects a printing font having 3×7 dot array (step 135).

Further, if it is determined at step 9 that the number of the letters is less than 38, the output data generating means 3 similarly generates all letters corresponding to the data relating to the amount of money indicated by English letters having a number less than 38, with a printing font having a 5×7 dot array (step 136). From step 131 to step 136, the output data generating means 3 develops a string of letters for a certain printing space, and with the repetitions of step to step 12 and step 131 to step 136, develops strings of image letters for all printing spaces on the check sheet 70 (step 14).

The data comparing means 4 determines whether an added dot number (the column of the data) which is obtained by adding a dot number at the initial printing position to the dot number of a letter string among the strings of image letters, is greater than a preset printing area dot number (the maximum printing data volume) for the check sheet 70 or not (step 15). If it is determined that the added dot number is less than the printing area dot number, the paper feed means 7 initiates the feed of the check sheet 70, and the printing means 8 performs the printing (step 16).

Further, if it is determined that the added dot number is greater than the printing area dot number, an error message is displayed on the LCD display 10 (step 17). Determination whether the procedure is continued or not is made in this error message display condition (step 18). If it is continued, the procedure is shifted to step 16, but if it is not continued, the printing is interrupted (step 20).

It is noted that although the explanation has been made such that the initial printing position is previously known, the initial printing position and the printing area have to be designated when a check for a different trade bank is issued as one example. However, since checks used for banking transaction can be sorted into a certain number of kinds, it is convenient if fixed forms for the sorted kinds have been prepared beforehand.

Figure 8:
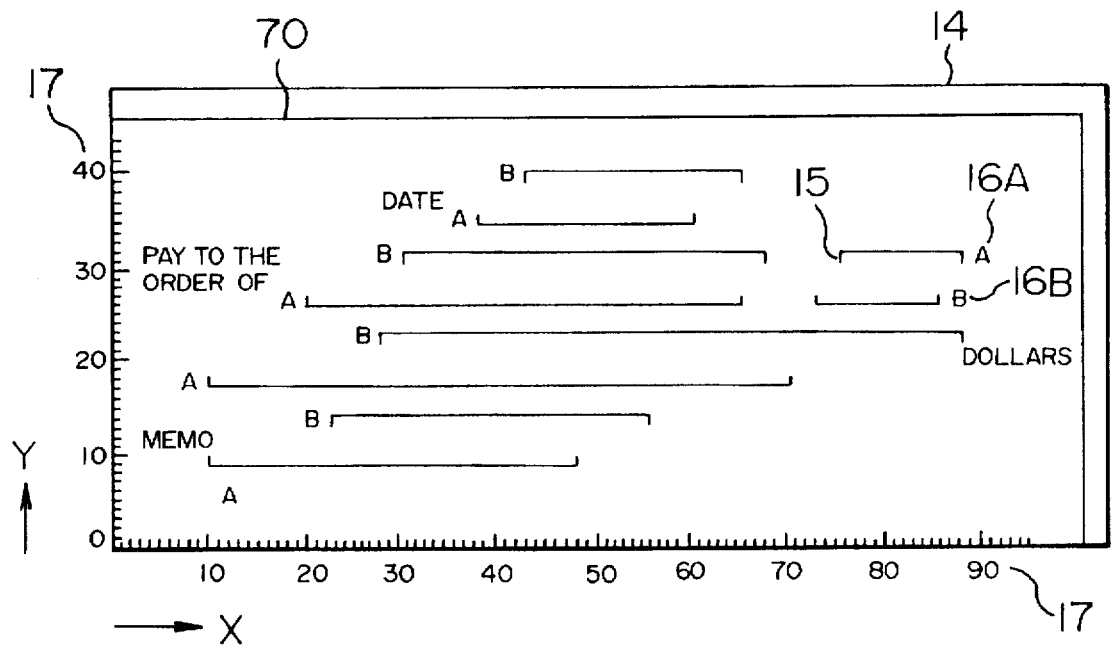
FIG. 8 is a view illustrating an example of a temp late for giving a fixed form format.

Referring to FIG. 8 which shows a template 14 on which fixed forms for the sorted kinds are indicated, there are shown a template 14 formed on a transparent plate, a plurality of initial printing positions 15, codes 16a, 16b for the initial printing positions and gradations 17 (unit: mm) for giving coordinates in the X- and Y-axial directions. This template is adapted to be superposed with the check sheet 70 in order to set the initial printing positions 15.

Figure 9:
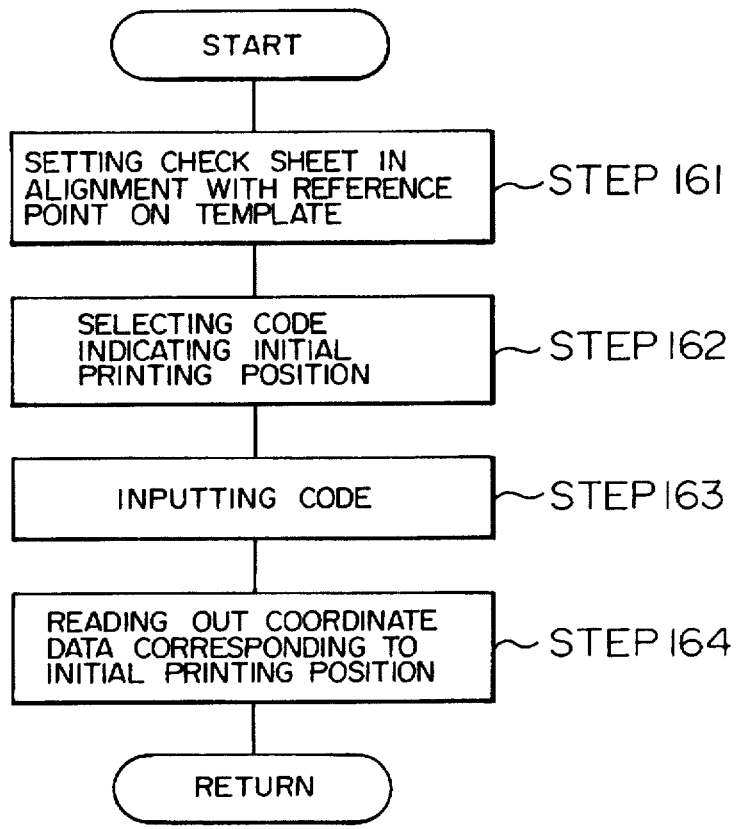
FIG. 9 is a flowchart showing a subroutine for setting an initial printing position using the template shown in FIG. 8.

Referring to FIG. 9 which is a flowchart showing a subroutine for setting an initial printing position, explanation will be made of the setting of the initial printing position. As shown in FIG. 8, the check sheet 70 is set being aligned with reference points on the transparent template 14 (step 161). Either one of 15 the codes 16a, 16b for indicating one of the initial printing positions which is optimum for the check sheet 70 is selected in view of the plurality of initial printing positions 15 and the codes 16a, 16b (step 162). After selection of a code 16a or 16b (it the code 16a is selected, a code is A), the code A is inputted through the data keys 90, and the setting key 95 is depressed (step 163). The computing and controlling part 2 reads coordinate data for the initial printing position corresponding to the code A from the fixed form memory area in the ROM 61 in accordance with the inputted code A, and stores the same in a memory area corresponding to the initial printing position within the RAM 62 so as to set the initial printing position (step 164). It is noted that if the initial printing positions indicated on the template are not met with the check sheet 70, the codes are not used, but the X-Y coordinates are inputted in view of the gradations 17.

Figure 6:
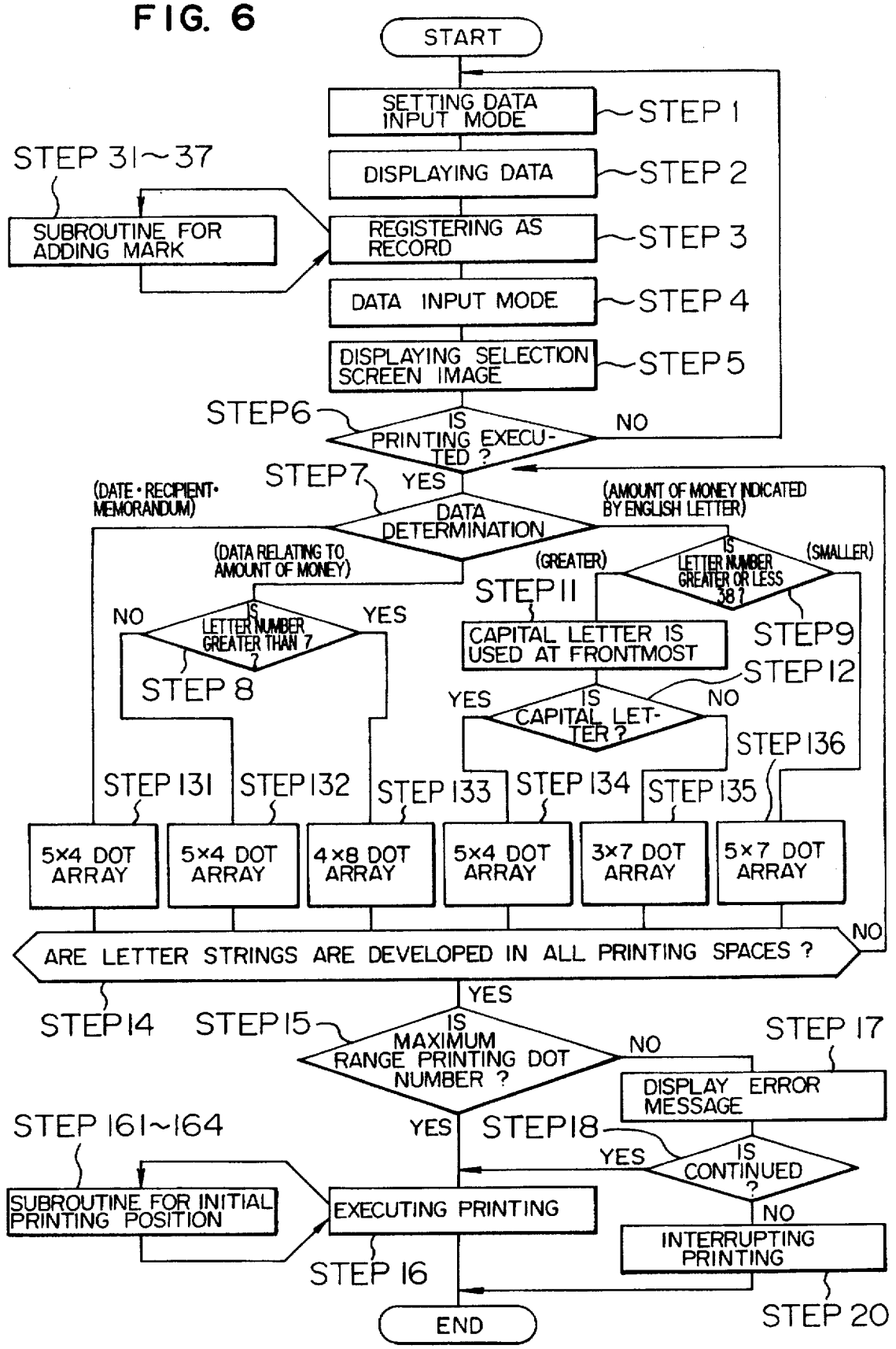
FIG. 6 is a flowchart showing an operational process of issuing a check with the use of the check issuance machine shown in FIG. 1.

Thus, the newly set coordinate data corresponding to the initial printing position are used for the output data generating means 3, and the procedure is again returned to the steps subsequent to step 16 shown in FIG. 6. The printing data of one record relating to the recipient, the memorandum and the date, signature data and the like which have been registered at step 3 are read from a predetermined memory area in the RAM 62 so that the printing is started from the initial printing position by the shuttle head 82, and the paper feed rollers 84 are driven so as to feed the check sheet 70 in the main scanning direction (as shown by the arrow A indicated by the solid line) while the ribbon 78 is fed in the subscanning direction (as shown by the arrow B indicated by the chain line). Thus, the printing is made on the check sheet 70 as exemplified in FIG. 5.

As mentioned above, according to the present invention, data and an amount of money required for issuance of a check are generated as printing data in the form of output data strings, and the volume of the printing data is compared with a possible printing data volume. Further, a printing font is selected for some letters in the printing data in accordance with a result of the comparison. Accordingly, a large size font is selected for letters in a printing area where the content of the printing has to be confirmed, but a small size font is selected for letters in the other printing areas, thereby it is possible to enhance the visibility of the content printed on the check sheet.

Further, since a mark is added, in particular, to letters indicating an amount of money, it is possible to prevent a check from being raised, thereby it is possible to enhance the trust in banking transaction. Further, since an optimum initial printing position can be easily set with the use of the template, it is possible to provide a small-sized printer which can appropriately print letters in a limited printing area in a check sheet having a small size, and which can be easily handled.

As mentioned above, the explanation has been made of one embodiment in the case of issuance of a check. However, the present invention can be applied for other cases. That is, the small-sized printer according to the present invention, having the function of selecting a printing font and the function of adding a mark to the indication of an amount of money, can be used for various other cases, in a similar manner as explained in the above-mentioned embodiment. In this case, it is possible to provide an effect such that the visibility of the printed content can be enhanced, and an effect such that the trust in banking transactions can be enhanced by preventing a check from being raised.

Further, a small-sized printer according to the present invention, having the function of selecting a printing font and the function of setting a printing position with the use of the template, can be used for various other cases, in a similar manner as explained in the above-mentioned embodiment. In this case, it is possible to provide an easily handled small-sized printer having the full of an effect such that the visibility of the content of printing can be enhanced, and an effect such that the printing can made in a limited printing space.

Moreover, a small-sized printer having a function of selecting a printing font can be provided, in a similar manner as stated in the above-mentioned embodiment. In this case, it is possible to provide a small-sized printer, having the full of an effect such that the visibility of the content of printing can be enhanced. It is noted that these examples as mentioned just above can be made similar to that explained in the above-mentioned embodiment, and accordingly, detailed explanation thereto is abbreviated in order to avoid the redundancies.

Further, although explanation has been made of the embodiment in which the check sheet 70 is printed, it goes without saying that the present invention can be applied for various business trades using slips or the like. That is, it is self-explanatory that the small-sized printer stated in the above-mentioned embodiment can be used for other various cases which require the printing in a limited printing area.

What is claimed is:

1. A printer comprising:

input means for receiving an input of data;

memory means for storing said data;

display means for displaying information associated with the data;

output data generating means for generating printing data in accordance with said data;

printing means for printing the printing data on a printing medium;

comparing means for comparing a printing capacity of a preset printing area on said printing medium with a volume of the printing data generated by said output data generating means; and font selecting means for selecting a printing font used for said printing means in accordance with a result of comparison by said comparing means;

the font selecting means selecting numerals having at least one of narrow widths and lower-case letters when the comparing means determines that the volume exceeds the printing capacity.

2. A printer comprising:

input means for receiving an input of data;

memory means for storing said data;

display means for displaying information associated with the data;

output data generating means for generating printing data in accordance with said data;

mark adding means for adding predetermined mark data to the printing data so as to convert the mark data and the printing data into new printing data;

printing means for printing the new printing data on a printing medium;

comparing means for comparing a printing capacity of a preset printing area on said printing medium with a volume of the new printing data; and font selecting means for selecting a printing font used for said printing means in accordance with a result of comparison by said comparing means;

the font selecting means selecting numerals having at least one of narrow widths and lower-case letters when the comparing means determines that the volume exceeds the printing capacity.

3. A printer as set forth in claim 2, wherein said mark adding means adds said predetermined mark data to said printing data if said printing data are letter data indicating an amount of money.

4. A printer as set forth in claim 2, wherein said mark adding means adds said predetermined mark data to said printing data if said printing data are numeral data indicating an amount of money.

5. A printer as set forth in claim 2, wherein said printing data comprise letter data and numeral data both indicating an amount of money, and said mark adding means adds said predetermined mark data to both said letter data and said numeral data.

6. A printer including a body casing with a first width and adapted to print a printing medium having a second width which is not larger than the first width of said body casing, said printer comprising:

input means for receiving an input of data and codes;

memory means for storing said data and codes;

display means for displaying information relating to said data;

output data generating means for generating printing data in accordance with said data;

printing means for printing said printing data on said printing medium;

comparing means for comparing a printing capacity of a preset printing area on said printing medium with a volume of the printing data generated by said output data generating means;

font selecting means for selecting a printing font used for said printing means in accordance with a result of comparison made by said data comparing means;

the font selecting means selecting numerals having at least one of narrow widths and lower-case letters when the comparing means determines that the volume exceeds the printing capacity; and a separate template on which a plurality of initial printing positions and indicating codes indicating the initial printing positions are indicated, for designating an initial printing position by inputting a corresponding one of said indicating codes into said input means as one of said codes.

7. A printer including a body casing with a first width and adapted to print a printing medium having a second width which is not larger than the first width of said body casing, said printer comprising:

input means for receiving an input of data and codes;

memory means for storing said data and codes;

display means for displaying information relating to said data;

output data generating means for generating printing data in accordance with said data;

mark adding means for adding predetermined mark data to the printing data so as to convert the mark data and the printing data into new printing data;

printing means for printing said new printing data on said printing medium;

data comparing means for comparing a printing capacity of a preset printing area on said printing medium with a volume of the new printing data;

font selecting means for selecting a predetermined printing font used for said printing means in accordance with a result of comparison made by said data comparing means;

the font selecting means selecting numerals having at least one of narrow widths and lower-case letters when the comparing means determines that the volume exceeds the printing capacity; and a separate template on which a plurality of initial printing positions and indicating codes indicating the initial printing positions are indicated, for designating an initial printing position by inputting a corresponding one of said indicating codes into said input means as one of said codes.

8. A printer as set forth in claim 7, wherein said mark adding means adds said predetermined mark data to said printing data if said printing data are letter data indicating an amount of money.

9. A printer as set forth in claim 7, wherein said mark adding means adds said predetermined mark data to said printing data if said printing data are numeral data indicating an amount of money.

10. A printer as set forth in claim 7, wherein said printing data comprise letter data and numeral data both indicating an amount of money, and said mark adding means adds said predetermined mark data to both said letter data and said numeral data.

11. A printer as set forth in claim 1, wherein said printing medium is a check adapted to be used for a banking transaction.

12. A printer as set forth in claim 2, wherein said printing medium is a check adapted to be used for a banking transaction.

13. A printer as set forth in claim 6, wherein said printing medium is a check adapted to be used for a banking transaction.

14. A printer as set forth in claim 7, wherein said printing medium is a check adapted to be used for a banking transaction.

15. A printer as set forth in claim 6, wherein said body casing has a portable size.

16. A printer as set forth in claim 7, wherein said body casing has a portable size.

* * * * *